United States Patent [19]
Krechel et al.

[11] 4,321,940
[45] Mar. 30, 1982

[54] UNLOADER/CHECK VALVE

[75] Inventors: Joseph L. Krechel, Ladue; Michael J. Purvis, Fenton, both of Mo.

[73] Assignee: Control Devices, Incorporated, St. Louis, Mo.

[21] Appl. No.: 226,110

[22] Filed: Jan. 19, 1981

[51] Int. Cl.³ .................. G05D 11/03; F04B 49/08
[52] U.S. Cl. ................... 137/116; 137/514.7; 417/299
[58] Field of Search ............... 417/299; 137/115, 116, 137/119, 514.7

[56] References Cited
U.S. PATENT DOCUMENTS

| | | | |
|---|---|---|---|
| 2,041,906 | 5/1936 | Czarnecki | 137/116 |
| 2,318,963 | 5/1943 | Parker | 137/514.7 |
| 2,554,390 | 5/1951 | Stevenson | 137/514.7 |
| 3,358,705 | 12/1967 | Krechel | 137/116 |
| 3,871,397 | 3/1975 | Larsen | 417/299 |
| 3,999,568 | 12/1976 | Chapman | 137/116 |

OTHER PUBLICATIONS

Control Devices Publication re "load genie", Jan. 19, 1981.

Primary Examiner—H. Jay Spiegel
Attorney, Agent, or Firm—Senniger, Powers, Leavitt and Roedel

[57] ABSTRACT

An unloader/check valve for use with an air compressor comprising a one-piece valve body, a valve member slidable in the body between open and closed positions, biased toward its closed position, the valve having a bleed for unloading the compressor when the valve member is in its closed position, and a dashpot arrangement for damping pulsations of the valve member.

9 Claims, 4 Drawing Figures

U.S. Patent  Mar. 30, 1982  4,321,940
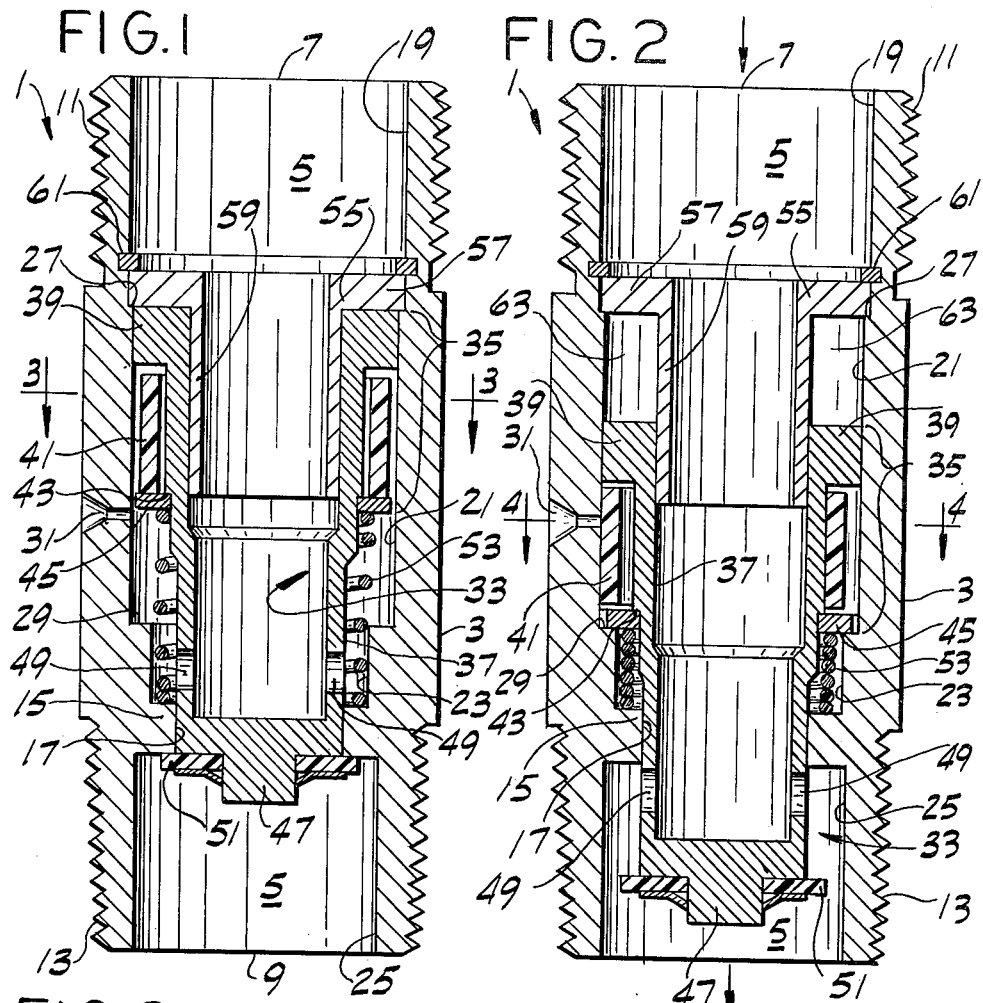
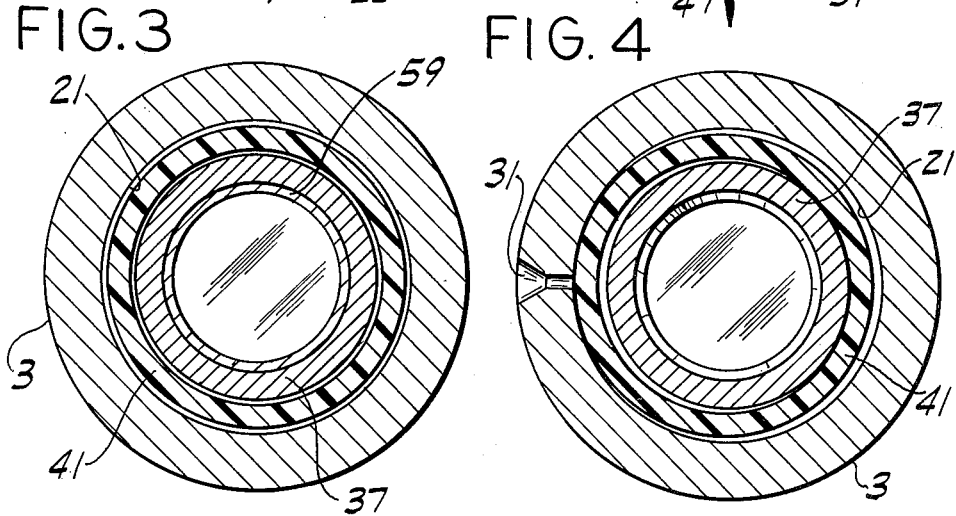

UNLOADER/CHECK VALVE

BACKGROUND OF THE INVENTION

This invention relates to a combination unloader and check valve, and more particularly to an unloader/check valve for use with an air compressor.

The invention especially involves an improvement on an unloader/check valve of the type shown in U.S. Pat. No. 3,358,705, in which the valve is damped to prevent its pulsating in sympathy with the opening and closing of the compressor discharge valves.

Although damped unloader/check valves constructed as shown in U.S. Pat. No. 3,358,705 have given satisfactory service for a long time, certain problems have sometimes arisen. For example, overtightening the threads at the downstream end of the valve sometimes jams the piston of the valve. When the valve is closed, the upstream end of the piston protrudes at the upstream end of the valve and may thereby tend to trap "varnish" and moisture. Also, it may be nicked or otherwise damaged when the valve is installed. With the outer body of the valve made of two threaded-together parts, assembly costs may become relatively high and some misalignment problems may occur.

SUMMARY OF THE INVENTION

Accordingly, among the several objects of the invention may be noted the provision of an improved damped unloader/check valve for use with an air compressor; the provision of such an unloader/check valve having a one-piece body, adapted to be easily assembled; the provision of such an unloader/check valve which is not likely to be damaged on installation; the provision of such an unloader/check valve which is self-draining of moisture and self-flushing to prevent deposits of "varnish" or the like; and the provision of such an unloader/check valve in which wear of internal sliding parts is reduced.

Generally an unloader/check valve of this invention comprises a one-piece elongate valve body with a hole therethrough from one end constituting its inlet or upstream end to the other end constituting its outlet or downstream end. The valve body is formed to provide an integral valve seat in the hole. The hole includes a first bore extending in from the inlet end, a second bore of smaller diameter than the first extending downstream from the first, and a third bore of smaller diameter than the second extending downstream from the second to the seat. A fourth bore extends upstream from the outlet to the seat, the seat having a central opening of smaller diameter than all of the bores. Thus, the hole has a first upstream-facing annular shoulder at the downstream end of the first bore and a second upstream-facing shoulder at the downstream end of the second bore. The valve body has an air bleed extending from the second bore to the outside, spaced downstream from the first shoulder. A valve means is axially slidable in the hole, comprising annular piston means slidable in the second bore and a tubular stem extending downstream from the piston. The stem is closed at its downstream end and closes the opening in the valve seat when the valve member is in a retracted position. A dashpot cylinder has an annular head received in the first bore seated against the first shoulder and a central tubular extension extending downstream from the head within the valve member, means being provided for holding the head against the first shoulder. The second bore, the tubular extension and the annular head form a dashpot chamber, the piston means being slidable on the tubular extension in this chamber. A spring reacting from the valve seat against the piston means biases the valve means toward its retracted position, in which the piston means uncovers the bleed. The tubular valve stem has at least one port adjacent its downstream end which, when the valve means is in its retracted position, is upstream from the valve seat for blocking flow of air through the valve stem to the outlet end of the hole. The valve means is movable downstream from the retracted position against the spring bias to a fully open position determined by engagement of the piston means with the second shoulder. In the open position the port in the stem is downstream from the valve seat for flow of air through the stem and the port to the outlet end of the hole, the piston blocking the bleed upon movement away from its retracted position.

Other objects and features will be in part apparent and in part pointed out hereinafter.

BRIEF DESCRIPTION OF THE DRAWINGS

FIG. 1 is a longitudinal cross-section of an unloader/check valve of this invention, shown with its movable valve member in its retracted, closed position;

FIG. 2 is a section similar to FIG. 1 showing the valve member in its open position with a floating sleeve blocking an air bleed;

FIG. 3 is a transverse section taken on line 3—3 of FIG. 1 illustrating the floating sleeve; and FIG. 4 is a transverse section taken on line 4—4 of FIG. 2 showing the floating sleeve sealing the air bleed.

Corresponding reference characters indicate corresponding parts throughout the several views of the drawings.

DESCRIPTION OF THE PREFERRED EMBODIMENT

Referring to the drawings, there is generally indicated at 1 a combination unloader and check valve of this invention particularly for use for interconnecting an air compressor and an air storage tank to serve two functions: to prevent air flow back from the tank to the compressor, and to bleed off or unload air when the compressor is started to reduce the starting load on the compressor motor. The valve 1, as shown, comprises a one-piece elongate valve body 3, which may be made of brass, for example, having a hole 5 of circular cross-section extending therethrough from one end of the body constituting its inlet end 7 to the other end constituting its outlet end 9. In use, the valve is generally mounted with the inlet end upward, as in FIGS. 1 and 2. The inlet end of the body has external threads 11 and the exit end likewise has external threads 13. An integral annular valve seat 15 is provided within the body spaced from the outlet end. This seat has a circular central opening 17 concentric with circular hole 5. The latter comprises a first bore 19 extending in from inlet end 7, a second concentric bore 21 of smaller diameter than the first extending downstream from the first, and a third concentric bore 23 of smaller diameter than the second extending downstream from the second to valve seat 15. A fourth concentric bore 25 extends upstream from outlet end 9 to the valve seat. The bores thereby provide a first upstream-facing shoulder 27 at the downstream end of first bore 19 and a second upstream-facing shoulder 29 at the downstream end of second bore 21.

Opening 17 within the valve seat is of smaller diameter than all of the bores. Valve body 3 has an air bleed hole or unloader port 31 extending from second bore 21 to the outside of the body, spaced downstream from first shoulder 27.

Valve means, generally designated 33 and hereinafter referred to as the valve member, is axially slidable in hole 5. It comprises annular piston means, designated in brackets by the numeral 35, and a tubular stem 37 extending downstream from the piston means. The piston means comprises an integral annular flange 39 at the upstream end of the tubular stem and a sleeve 41 on the stem downstream of the annular flange. Preferably, the sleeve is made of an anti-friction relatively resilient synthetic resin material such as a glass-fiber-filled polytetrafluoroethylene (Teflon), while the valve body, stem and flange are of metal, such as brass. In its unstressed condition, the sleeve has an inner diameter greater than the outer diameter of tubular stem 37 and an outer diameter less than the inner diameter of second bore 21, so that the sleeve may "float" on the stem, as shown in FIGS. 1 and 3.

The stem has an external downstream-facing shoulder 43 spaced downstream from the annular flange 39. The piston means 35 includes a thrust washer 45 on the stem engaging the shoulder to hold the floating sleeve 41 in place, the sleeve being somewhat shorter in length than the distance between the downstream face of flange 39 and the upstream face of the thrust washer to be free to move longitudinally within limits defined by the flange and the thrust washer. The stem has a closed downstream end 47, is slidable at this end in opening 17 in the valve seat, and has at least one radial port 49 (a plurality of such ports are preferred) adjacent said end. These ports are upstream of the valve seat when valve member 33 is in its retracted closed position (FIG. 1). The valve member is movable downstream to a fully open position determined by engagement of thrust washer 45 of the piston means with second shoulder 29, as shown in FIG. 2. In this open position the port or ports 49 are downstream from valve seat 15 for flow of air through stem 37 and the ports to the outlet end of the valve body. The stem has a disk of suitable elastomeric material forming a seal 51 at its downstream and extending radially outwardly of closed end 47 of the stem to seal against the downstream face of valve seat 15 when the valve member is retracted, as shown in FIG. 1.

A coil spring 53 reacts from the upstream face of valve seat 15 against thrust washer 45 of the piston means, biasing the valve member 33 toward its retracted closed (FIG. 1) position. When the valve member is retracted, bleed 31 is open, and when the valve member moves away from the retracted position against the spring bias (as shown in FIG. 2) sleeve 41 blocks the bleed.

A dashpot cylinder, generally designated 55, has an annular head 57 received in the stated first bore 19 against the stated first shoulder 27 and a central tubular extension 59 extending downstream from the radial inner edge of the head within the valve means 33. The dashpot cylinder is fixed in place by a snap ring 61 received in a groove in the valve body at the upstream side of the annular head, the ring constituting means holding the head against the stated first shoulder 27. The second bore 21, the tubular extension 59 and the annular head 57 together form a dashpot chamber 63, piston means 35 being slidable on the tubular extension in this chamber. The retracted (FIG. 1) position of the valve member is determined by engagement of the annular piston flange 39 at the upstream end of the valve member with the annular head 57 of the dashpot cylinder. The inner diameter of the annular piston flange is slightly greater than the outer diameter of tubular extension 59 to provide enough clearance to allow draining of moisture from dashpot chamber 63 when the unloader/check valve is mounted vertically with inlet end 7 upward, as shown in FIGS. 1 and 2.

In use, the unloader/check valve 1 is connected between the an air compressor (not shown) and a storage tank (not shown) with the valve mounted vertically inlet end 7 up as shown in FIGS. 1 and 2. A line from the air compressor is connected to the inlet end of the valve, and its outlet end is in communication with the tank, e.g., by threading end 13 of the valve body in a tapped hole at the top of the tank. When the compressor is off, valve member 33 is biased by coil spring 53 to its retracted closed position shown in FIG. 1. Seal 51 seals valve seat 15 so that air in the storage tank does not escape. The interior of the valve body 3 is at outside pressure via the open bleed 31.

When the compressor is started, part of the air pumped into the valve by the compressor escapes through the interior of the stem 37, the ports 49 and the bleed 31. As the compressor comes up to speed, the pressure within the valve body increases since all the air pumped into the valve cannot escape through the bleed. When the internal valve pressure exceeds the storage tank pressure by an amount sufficient to overcome the bias of spring 53, valve member 33 slides down to its open position (FIG. 2) wherein the ports 49 in the valve stem are downstream from the valve seat. As the valve member opens, sleeve 41 moves down into position to block the bleed 31, and shifts laterally from a position generally concentric with the stem (as in FIGS. 1 and 3) toward the bleed, thereby positively to seal the bleed (FIGS. 2 and 4).

During continued operation of the compressor, the pressure within the valve increases and decreases with the opening and closing of the discharge valves of the compressor, tending to cause valve member 33 to alternately move partway toward the closed position and then back to the open position. However, air within dashpot chamber 63 tends to damp pulsations or "flutter" of the valve member. Due to the positive seal of the floating sleeve 41 on the internal surface of the valve body at the bleed, the pressures on the inner and outer sides of valve member 33 are generally equivalent, preventing movement of the valve member which would tend to cause increased wear of the sliding surfaces.

Lodging or build-up of foreign material such as "varnish" within our new unloader/check valve is minimized. The interior of the valve is self-flushing; generally, material cannot lodge behind the piston because it is out of the air flow. Any moisture which may enter dashpot chamber 63 is drained out between annular flange 39 and tubular extension 59. When the compressor is stopped and the pressure within the valve decreases to a value less than the pressure in the storage tank, the valve member 33 is retracted by spring 53, closing off the valve seat 15 and uncovering bleed 31. The unloader/check valve 1 is easily assembled, in part due to having a one-piece body. There is little likelihood of damage to internal valve parts when installing the valve because no delicate parts project near the inlet or outlet ends 7, 9.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An unloader/check valve, particularly for air compressors, comprising a one-piece elongate valve body having a hole therethrough from one end constituting its inlet end to the other constituting its outlet end, the valve body having an integral valve seat in the hole, the hole comprising a first bore extending in from the inlet end, a second bore of smaller diameter than the first extending downstream from the first, a third bore of smaller diameter than the second extending downstream from the second to the seat, a fourth bore extending upstream from the outlet end to the seat, and a central opening in the seat, with a first upstream-facing annular shoulder at the downstream end of the first bore and a second upstream-facing shoulder at the downstream end of the second bore, the opening in the seat being of smaller diameter than all said bores, the valve body having an air bleed from said second bore to the outside spaced downstream from said first shoulder, valve means axially slidable in the hole comprising annular piston means and a tubular stem extending downstream from the piston means, the piston means sliding in said second bore, the stem closing the opening in the valve seat when the valve means is in a retracted position, the stem being closed at its downstream end, a dashpot cylinder having an annular head received in said first bore seated against said first shoulder, said dashpot cylinder having a central tubular extension extending downstream from the head within the valve means, means holding said head against said first shoulder, the second bore, tubular extension and annular head forming a dashpot chamber, the piston means being slidable on said tubular extension in said dashpot chamber, spring means reacting from the valve seat against the piston means biasing said valve means toward said retracted position, said piston means then uncovering the bleed, the tubular valve stem having at least one port adjacent its downstream end which, when the valve means is in said retracted position, is upstream from the valve seat for blocking flow of air through the valve stem to the outlet end of the hole, said valve means being movable downstream against the spring bias to a fully open position determined by engagement of the piston means with the second shoulder wherein the port in the stem is downstream from the valve seat for flow of air through the stem and said port to the outlet end of the hole, said piston means blocking the bleed upon movement away from its retracted position.

2. An unloader/check valve as set forth in claim 1 wherein the piston means comprises an integral annular flange at the upstream end of the tubular stem, a sleeve on the stem downstream of the annular flange, and means on the stem holding the sleeve in place, the sleeve being adapted to uncover the bleed in the retracted position of the valve means and to cover the bleed upon movement of the valve means away from the retracted position.

3. An unloader/check valve as set forth in claim 2 wherein the sleeve is made of a resilient anti-friction material.

4. An unloader/check valve as set forth in claim 3 wherein the sleeve is a glass-fiber-filled polytetrafluoroethylene sleeve.

5. An unloader/check valve as set forth in claim 2 wherein the means holding the sleeve in place is a thrust washer on the stem at the downstream end of the sleeve.

6. An unloader/check valve as set forth in claim 2 wherein the sleeve is of an inner diameter greater than the outer diameter of the tubular stem and an outer diameter less than the inner diameter of the second bore whereby, upon movement of the valve means to the open position, the sleeve is enabled to shift laterally from a position generally concentric with the stem toward the bleed positively to seal the bleed.

7. An unloader/check valve as set forth in claim 1 wherein said retracted position of the valve means is determined by engagement of the upstream end of the valve means with the annular head of the dashpot cylinder.

8. An unloader/check valve as set forth in claim 1 wherein the stem has an elastomeric seal at its downstream end extending radially outwardly of the closed end of the stem to seal against the downstream face of the seat when the valve means is retracted.

9. An unloader/check valve as set forth in claim 1 wherein the inner diameter of the piston means is greater than the outer diameter of said tubular extension of the dashpot cylinder to provide clearance to allow draining of moisture from the dashpot chamber when the unloader/check valve is mounted vertically with the inlet end upward.

* * * * *